US012424796B2

(12) United States Patent
Mitsui et al.

(10) Patent No.: US 12,424,796 B2
(45) Date of Patent: Sep. 23, 2025

(54) SHIELDED TERMINAL

(71) Applicant: SUMITOMO WIRING SYSTEMS, LTD., Mie (JP)

(72) Inventors: Shohei Mitsui, Mie (JP); Norihito Hashimoto, Mie (JP); Motoki Kubota, Mie (JP); Wataru Yamanaka, Mie (JP); Keisuke Kanemura, Mie (JP); Kazuya Kobayashi, Mie (JP); Yusuke Ito, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 469 days.

(21) Appl. No.: 17/914,185

(22) PCT Filed: Mar. 8, 2021

(86) PCT No.: PCT/JP2021/008850

§ 371 (c)(1),
(2) Date: Jan. 17, 2023

(87) PCT Pub. No.: WO2021/192939

PCT Pub. Date: Sep. 30, 2021

(65) Prior Publication Data

US 2023/0163534 A1 May 25, 2023

(30) Foreign Application Priority Data

Mar. 27, 2020 (JP) ................................ 2020-057762

(51) Int. Cl.

*H01R 13/6581* (2011.01)
*H01R 13/6593* (2011.01)
*H01R 4/18* (2006.01)

(52) U.S. Cl.

CPC ..... *H01R 13/6593* (2013.01); *H01R 13/6581* (2013.01); *H01R 4/183* (2013.01)

(58) Field of Classification Search

CPC .. H01R 13/6592; H01R 13/6581; H01R 9/05; H01R 9/0518; H01R 2103/00; H01R 4/183

(Continued)

(56) References Cited

U.S. PATENT DOCUMENTS 8,414,329 B2 * 4/2013 Morikawa .............. H01R 4/185 439/585
10,355,463 B2 * 7/2019 Inoue .................. H05K 9/0007

(Continued)

OTHER PUBLICATIONS

International Search Report issued on May 25, 2021 for WO 2021/192939 A1 (4 pages).

*Primary Examiner* — Tulsidas C Patel
*Assistant Examiner* — Carlos E Lopez-Pagan
(74) *Attorney, Agent, or Firm* — Venjuris, P.C.

(57) ABSTRACT

The present invention prevents a cover from being incorrectly installed with respect to an external conductor. This shielded terminal is provided with: an external conductor (20) that has a connection space (28) which is between a pair of side walls (26), and which is open to the outside via a first opening (31) and a second opening (32); a shielded electric cable (70) that is connected to the external conductor (20); an internal conductor (11) that is housed in the external conductor (20) and that is connected to a core wire (71) of the shielded electric cable (70) in the connection space (28); and a cover (50) that is installed inside the connection space (28) from the first opening (31) and that surrounds the part at which the core wire (71) and the internal conductor (11) are connected, wherein an interference part (34) that interferes with the cover (50) is formed on the opening edge part of the second opening (32).

9 Claims, 5 Drawing Sheets

(58) Field of Classification Search
USPC .......................................................... 439/585
See application file for complete search history.

(56) References Cited

U.S. PATENT DOCUMENTS

| | | | | |
|---|---|---|---|---|
| 10,594,057 | B2 * | 3/2020 | Kanemura | H01R 43/16 |
| 2003/0224656 | A1 * | 12/2003 | Yoshida | H01R 13/4361 439/578 |
| 2006/0172600 | A1 | 8/2006 | Sakakura et al. | |
| 2018/0115115 | A1 * | 4/2018 | Nakashima | H01R 4/184 |
| 2018/0198266 | A1 | 7/2018 | Inoue | |
| 2019/0199014 | A1 | 6/2019 | Kanemura et al. | |

* cited by examiner

SHIELDED TERMINAL

CROSS REFERENCE TO RELATED APPLICATIONS

This application is a national phase of PCT application No. PCT/JP2021/008850, filed on 8 Mar. 2021, which claims priority from Japanese patent application No. 2020-057762, filed on 27 Mar. 2020, all of which are incorporated herein by reference.

BACKGROUND OF THE INVENTION

Field of the Invention

The present disclosure relates to a shielded terminal.

Description of Related Art

Patent Document 1 discloses a terminal fitting that is connected to a shielded electrical wire. The terminal fitting has an inner conductor, a dielectric body that surrounds the inner conductor, and an outer conductor that surrounds the dielectric body. The outer conductor has a tubular portion that surrounds the dielectric body, a shielding crimping portion that is crimped to braided wires of the shielded electrical wire, and a linking portion that links the tubular portion and the shielding crimping portion to each other. The inner conductor and the core wire of the shielded electrical wire are connected to each other in the linking portion. The linking portion has a pair of side wall portions, and two opening portions for enabling crimping of the inner conductor to the core wire using a pressing machine are formed between the pair of side wall portions. A cover member for shielding the connection portion between the inner conductor and the core wire is attached to the linking portion.

PRIOR ART DOCUMENT

Patent Document

Patent Document 1: JP 2019-114491 A

BRIEF SUMMARY OF THE INVENTION

Problems to be Solved

The cover member is housed in the linking portion through one of the two opening portions, and has a tubular shape so as to surround the inner conductor and the core wire. The cover member has a connection piece that is connected to the outer circumference of the tubular portion and a shield-side surrounding portion that is fixed to the shielding crimping portion. Thus, when the cover member is attached to the other opening portion of the two opening portions, the connection piece and the shield-side surrounding portion cannot be correctly attached to the outer conductor.

A shielded terminal according to the present disclosure was completed based on the aforementioned circumstances, and it is an object thereof to prevent incorrect attachment of the cover member to the outer conductor.

Means to Solve the Problem

A shielded terminal according to the present disclosure is a shielded terminal including:

an outer conductor that includes a connection space sandwiched between a pair of side wall portions, and in which the connection space is open to the outside via a first opening portion and a second opening portion;

a shielded electrical wire connected to the outer conductor;

an inner conductor housed in the outer conductor and connected to a core wire of the shielded electrical wire in the connection space;

and a cover member that is attached within the connection space through the first opening portion, and surrounds a connection portion between the core wire and the inner conductor, wherein an opening edge portion of the second opening portion is provided with an interference portion configured to interfere with the cover member.

Effect of the Invention

With the present disclosure, incorrect attachment of the cover member to the outer terminal can be prevented.

DETAILED DESCRIPTION OF THE INVENTION

Description of Embodiments of Present Disclosure

Figure 1:
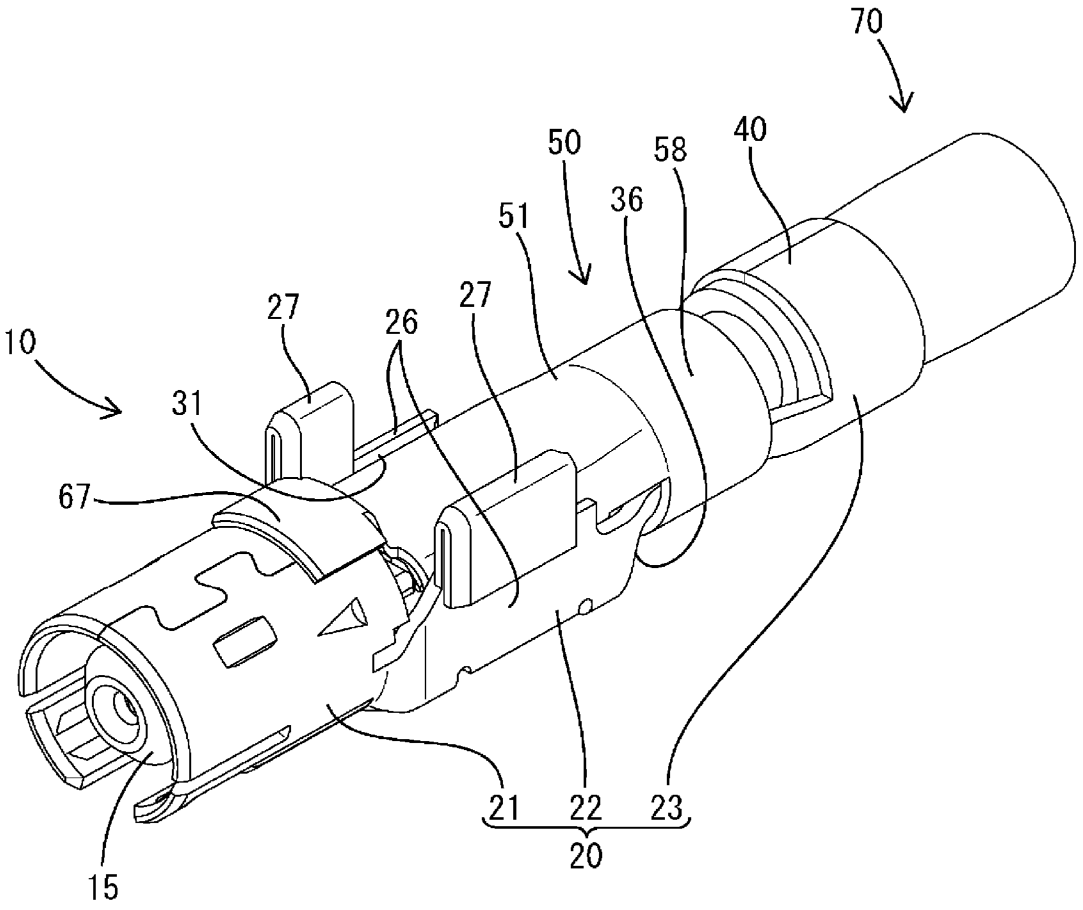
FIG. 1 is a perspective view of a shielded terminal.

First, embodiments of the present disclosure will be listed and described below.

(1) A shielded terminal of the present disclosure is a shielded terminal including: an outer conductor that includes a connection space sandwiched between a pair of side wall portions, and in which the connection space is open to the outside via a first opening portion and a second opening portion; a shielded electrical wire connected to the outer conductor; an inner conductor housed in the outer conductor and connected to a core wire of the shielded electrical wire in the connection space; and a cover member that is attached within the connection space through the first opening portion, and surrounds a connection portion between the core wire and the inner conductor, wherein an opening edge portion of the second opening portion is provided with an interference portion configured to interfere with the cover member. With the configuration of the present disclosure, when an attempt is made to attach the cover member to the second opening portion, interference occurs between the cover member and the interference portion, and thus the cover member cannot be attached to the second opening portion. Accordingly, with the present disclosure, incorrect attachment of the cover member to the outer conductor can be prevented.

(2) It is preferable that the interference portion bridges the pair of side wall portions. The interference portion that bridges the pair of side wall portions is more rigid than an interference portion that protrudes in the manner of a cantilever, and thus incorrect attachment of the cover member can be reliably prevented.

(3) It is preferable that the outer conductor has a crimping shielding portion that is crimped to a shielding layer of the shielded electrical wire, and the interference portion is continuous with the side wall portions and the crimping shielding portion. The interference portion that is continuous with the side wall portions and the crimping shielding portion is more rigid than an interference portion that protrudes from the side wall portions of the crimping shielding portion in the manner of a cantilever, and thus incorrect attachment of the cover member can be reliably prevented.

(4) In (3), it is preferable that the crimping shielding portion includes: a pair of support wall portions that are respectively diagonally continuous with rear edge portions of the pair of side wall portions; and a bottom wall portion that links the pair of support wall portions to each other on a rear side of the second opening portion, and the interference portion is formed so as to bridge the pair of side wall portions and to be continuous with the bottom wall portion over the entire length thereof. With this configuration, the pair of side wall portions, the pair of support wall portions, and the bottom wall portion that are continuous with the interference portion are continuous with each other with their wall surfaces facing different directions to each other, and thus the rigidity is increased. Accordingly, the rigidity of the interference portion that is continuous with the wall portions is also increased, and thus incorrect attachment of the cover member can be reliably prevented.

(5) It is preferable that the interference portion is formed so as to extend along at least one of a front edge portion and a rear edge portion of the second opening portion, the cover member includes a pair of side plate portions that are arranged so as to extend along inner surfaces of the pair of side wall portions, and surround the connection portion between the core wire and the inner conductor, and a front-rear length of the pair of side plate portions is set to a length greater than a front-rear opening length of the second opening portion. With this configuration, the side plate portions that surround the connection portion between the core wire and the inner conductor do not interfere with the interference portion, and thus there is no need to form a portion on the cover member side that is dedicated to interference with the interference portion. Accordingly, the shape of the cover member can be prevented from becoming complex.

(6) In (5), it is preferable that a protrusion is formed on an insertion edge portion on a leading end of the pair of side plate portions in a direction in which the side plate portions are inserted into the first opening portion, and the protrusion is disposed in a region that does not correspond to the interference portion in a front-rear direction. With this configuration, when the cover member is attached within the connection space through the first opening portion, the protrusion is disposed in the opening region of the second opening portion without being hidden by the interference portion. Accordingly, a mold of a press machine can be abutted against the protrusion in the second opening portion and deform the side plate portions, and thus the connection portion between the core wire and the inner conductor can be surrounded by the cover member. By providing the protrusion, an operation for deforming the side plate portions using a mold of a press machine can be reliably performed.

DETAILED DESCRIPTION OF EMBODIMENT OF THE PRESENT DISCLOSURE

Embodiment 1

Embodiment 1 which is an embodiment of a shielded terminal of the present disclosure will be described with reference to FIGS. 1 to 5. Note that the present invention is not limited to these illustrative examples, but is indicated by the claims, and all changes that come within the meaning and range of equivalency of the claims are intended to be embraced therein. In Embodiment 1, regarding the front-rear direction, the left side in FIGS. 1 to 5 is defined as the front side. The up and down directions of FIGS. 1 to 5 are defined as the upward direction and the downward direction as they are.

Figure 2:
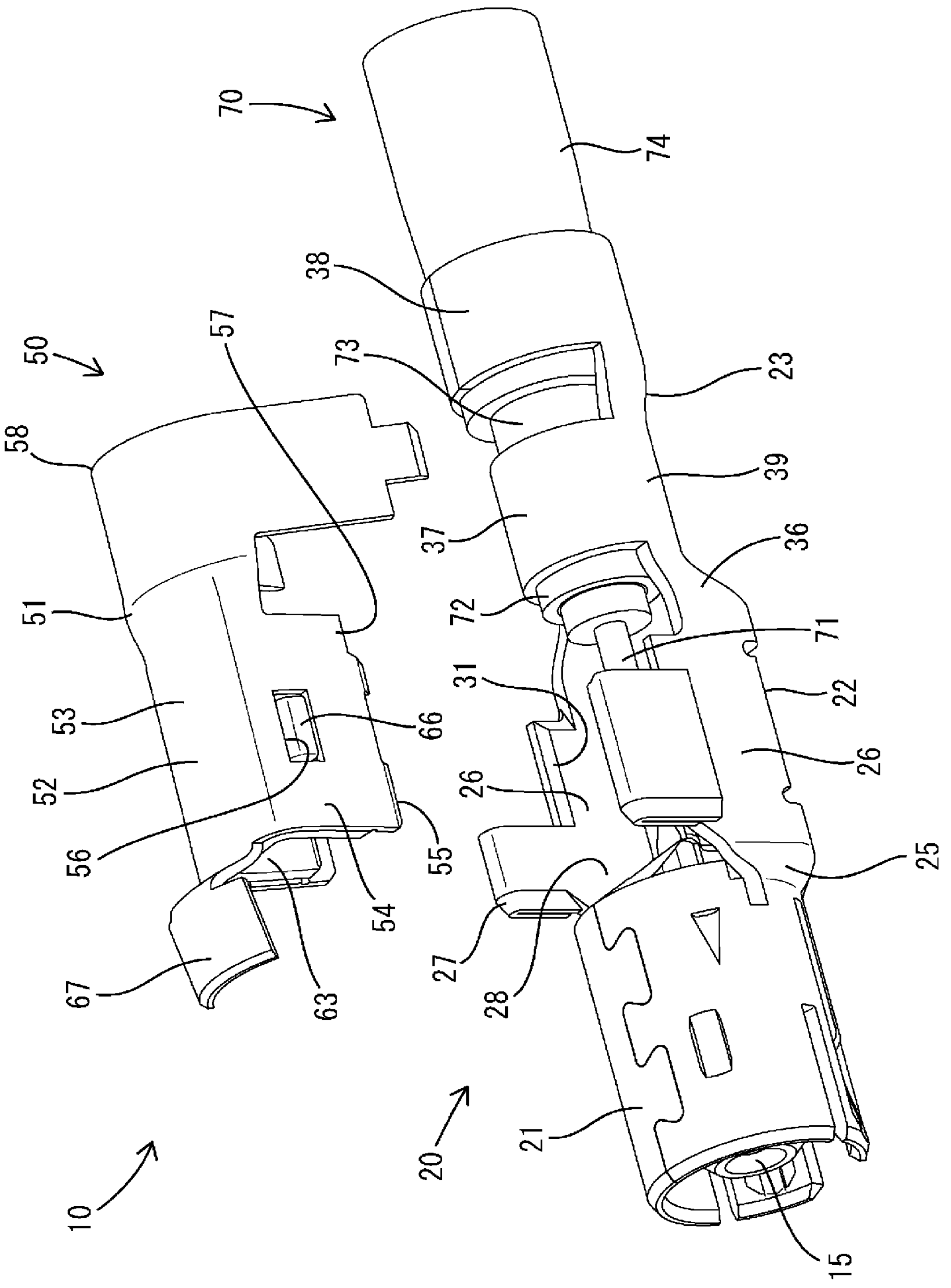
FIG. 2 is a perspective view showing a cover member separated from an outer conductor.
Figure 3:
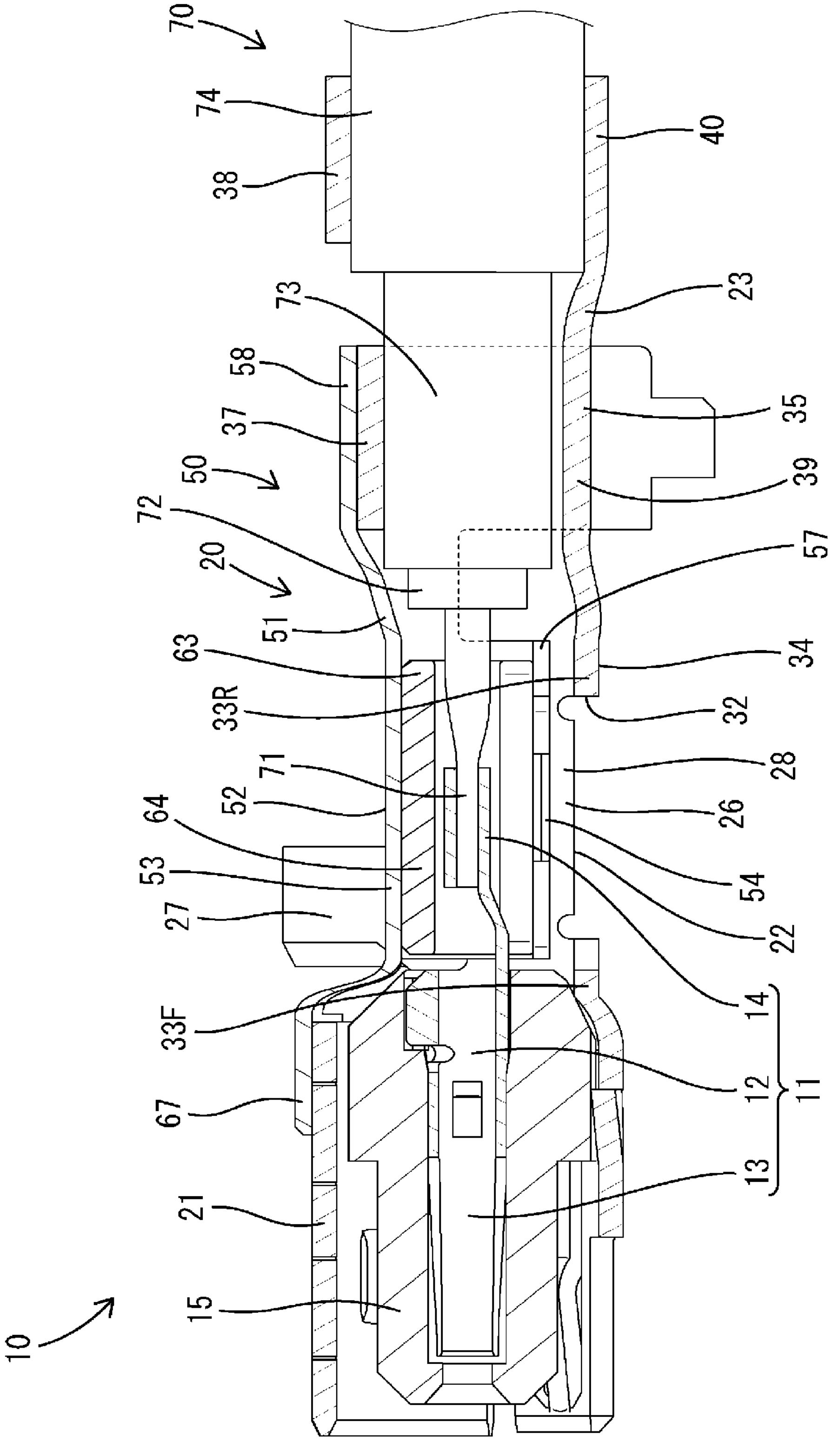
FIG. 3 is a side cross-sectional view showing the cover member attached to the outer conductor.

As shown in FIGS. 1 and 2, the shielded terminal of Embodiment 1 includes a terminal fitting 10 and a shielded electrical wire 70. As shown in FIG. 3, the terminal fitting 10 includes an inner conductor 11, a dielectric body 15, an outer conductor 20, and a cover member 50. As shown in FIG. 3, the inner conductor 11 has an overall elongated shape in the front-rear direction. The inner conductor 11 has a tubular main body portion 12, a pair of elastic contact portions 13 that extend forward from the main body portion 12 in the manner of a cantilever, and a core wire crimping portion 14 that protrudes rearward in an open barrel shape from the main body portion 12. The dielectric body 15 has a cylindrical shape whose axis extends in the front-rear direction. As shown in FIG. 3, the main body portion 12 and the elastic contact portions 13 of the inner conductor 11 are housed in the dielectric body 15. The core wire crimping portion 14 protrudes rearward from the rear end surface of the dielectric body 15.

The outer conductor 20 is a single component that is obtained by bending a metal plate member, and has an overall elongated shape in the front-rear direction. The outer conductor 20 has a tubular shielding portion 21, a connection shielding portion 22, and a crimping shielding portion 23. The tubular shielding portion 21 constitutes the front end portion of the outer conductor 20, and has a cylindrical shape whose axis extends in the front-rear direction. The main body portion 12 and the elastic contact portions 13 of the inner conductor 11 and the dielectric 15 are housed in their entirety in the tubular shielding portion 21.

Figure 4:
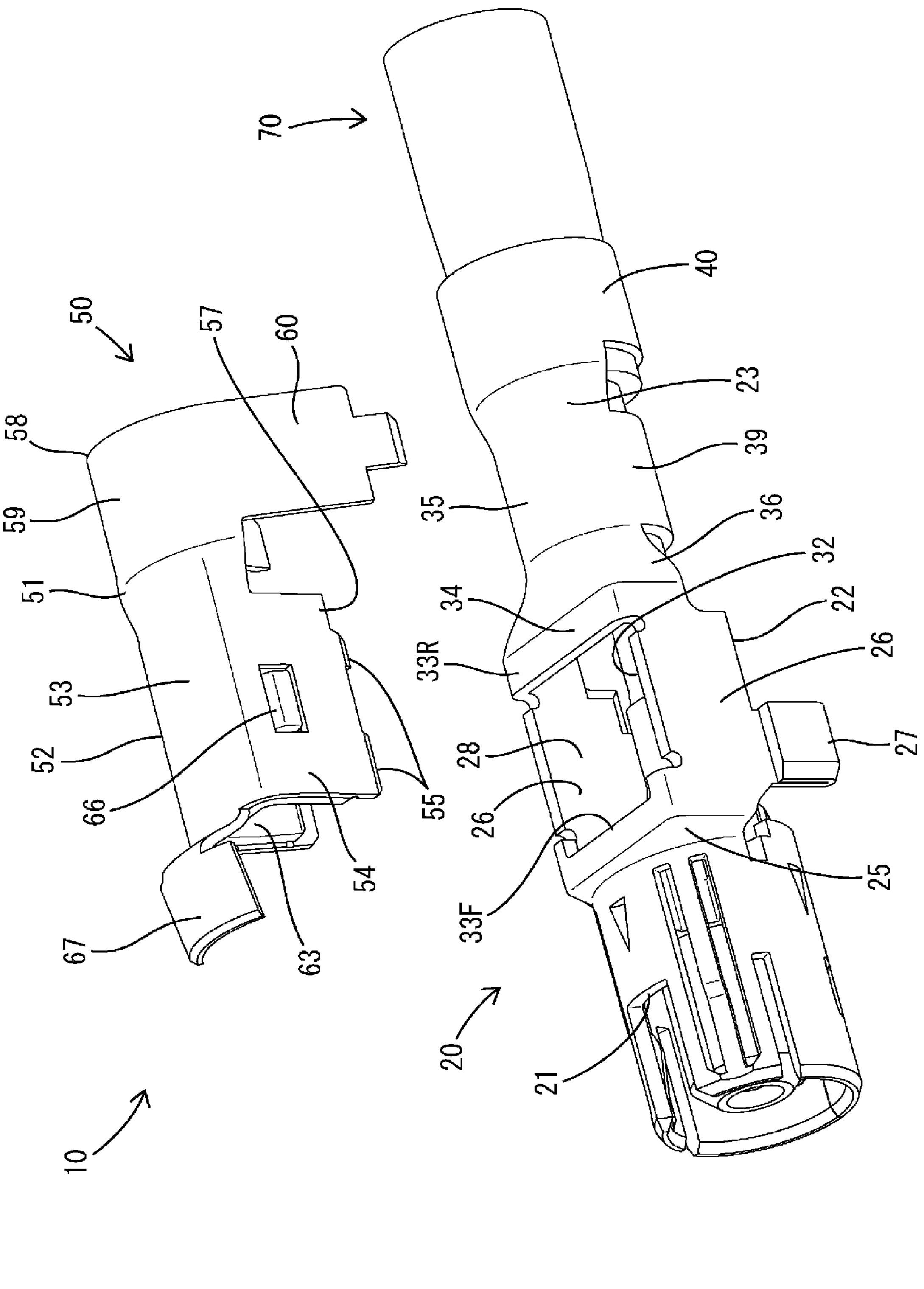
FIG. 4 is a perspective view showing the outer conductor and the cover member facing each other in an improper positional relationship.

As shown in FIG. 4, the connection shielding portion 22 has one front wall portion 25, a pair of side wall portions 26 that each have a flat plate shape and that are symmetrical in the left-right direction, a pair of stabilizers 27 that are not symmetrical in the left-right direction, and one interference portion 34. The front wall portion 25 is continuous with the lower semi-circular region of the rear edge of the tubular shielding portion 21, and protrudes in the manner of a flange from the outer circumference of the tubular shielding portion 21. The lower edge of the front wall portion 25 extends in the left-right direction. The left and right side edges of the front wall portion 25 extend in the up-down direction.

The pair of side wall portions 26 are oriented such that the wall thickness directions thereof extend in the left-right direction, and are disposed spaced apart from each other in the left-right direction while extending parallel to each other. The front edges of the left and right side wall portions 26 are orthogonally continuous with the left and right side edges of the front wall portion 25, respectively. Each stabilizer 27 protrudes upward from the front end portion of the upper edge of the corresponding side wall portion 26 (see FIG. 3).

As shown in FIG. 2, a connection space 28 demarcated by the left and right side wall portions 26 is formed in the connection shielding portion 22. The core wire crimping portion 14 of the inner conductor 11 is housed in the connection space 28. The upper surface of the connection shielding portion 22 is provided with a first opening portion 31 that opens the connection space 28 to the outside upward of the connection shielding portion 22. The first opening portion 31 is open in a region spanning the entire connection shielding portion 22 in the front-rear direction.

The lower surface of the connection shielding portion 22 is provided with a second opening portion 32 that opens the connection space 28 to the outside downward of the connection shielding portion 22. The connection shielding portion 22 has a shape that is penetrated in the up-down direction by the connection space 28, the first opening portion 31, and the second opening portion 32. The opening range in the front-rear direction of the second opening portion 32 is a region extending from a position rearward of the front end of the connection shielding portion 22 to a position forward of the rear end of the connection shielding portion 22. That is, the front-rear opening length of the second opening portion 32 is smaller than the front-rear opening length of the first opening portion 31.

Figure 5:
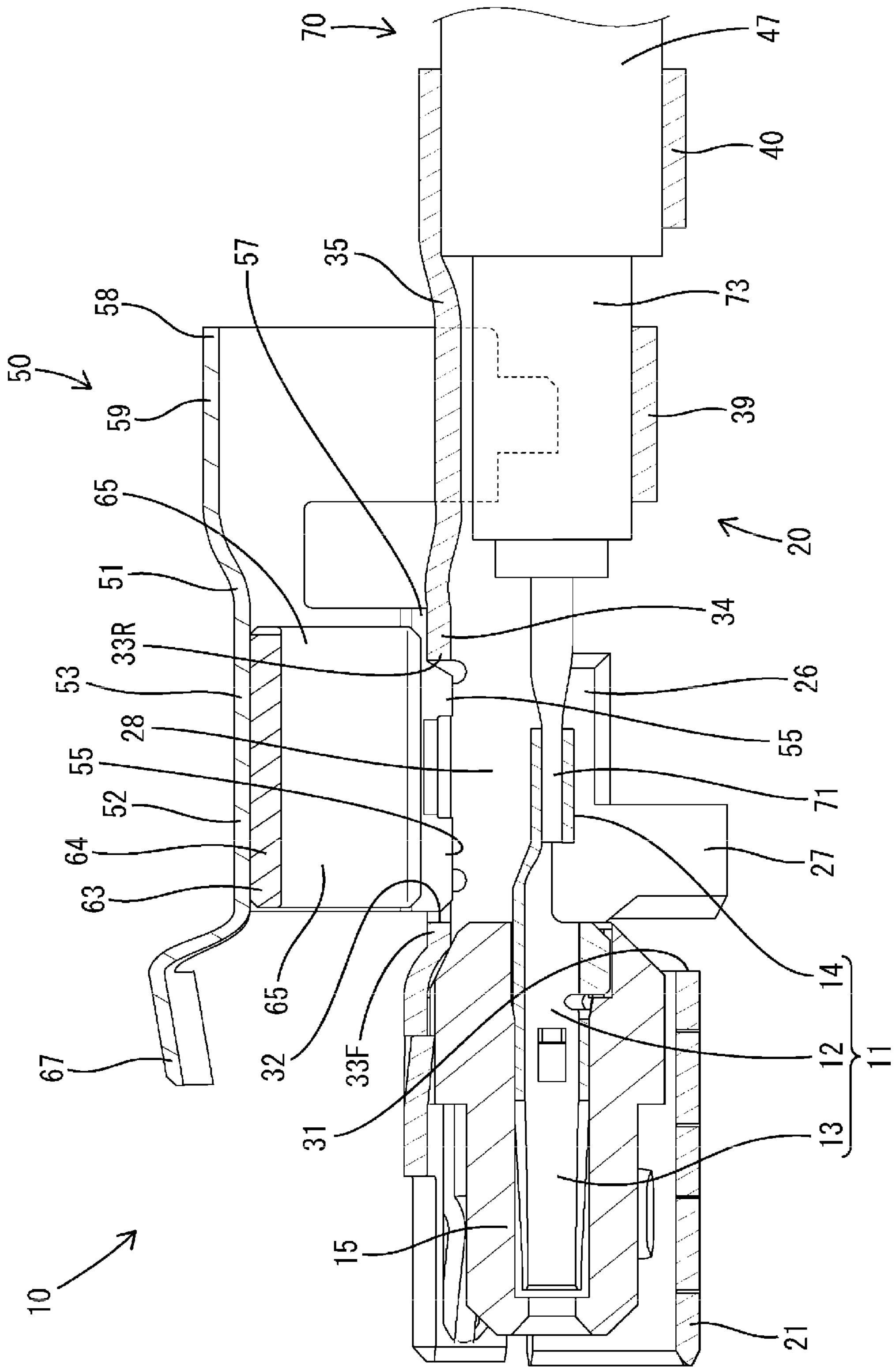
FIG. 5 is a side cross-sectional view showing the cover member being prevented from being incorrectly attached due to interference by an interference portion.

As shown in FIGS. 4 and 5, the lower surface of the connection shielding portion 22 is provided with a front reinforcement portion 33F and a rear reinforcement portion 33R. The front reinforcement portion 33F has a flat plate shape that is elongated in the left-right direction, and is disposed along the front edge of the opening edge of the second opening portion 32. The front edge of the front reinforcement portion 33F is orthogonally continuous with the lower edge of the front wall portion 25. The left and right ends of the front reinforcement portion 33F are orthogonally continuous to the front end portions of the lower edge portions of the left and right side wall portions 26, respectively. The front reinforcement portion 33F bridges the two side wall portions 26.

Similarly to the front reinforcement portion 33F, the rear reinforcement portion 33R has a flat plate shape that is elongated in the left-right direction, and is disposed along the rear edge of the opening edge of the second opening portion 32. The left and right ends of the rear reinforcement portion 33R are orthogonally continuous with the rear end portions of the lower edge portions of the left and right side wall portions 26, respectively. The rear reinforcement portion 33R bridges the two side wall portions 26. The rear reinforcement portion 33R also functions as the interference portion 34 configured to abut against the later-described cover member 50. The distance between the rear edge of the front reinforcement portion 33F and the front edge of the rear reinforcement portion 33R (interference portion 34) is the front-rear opening length of the second opening portion 32.

The crimping shielding portion 23 includes a bottom wall portion 35, a pair of support wall portions 36 that are symmetrical in the left-right direction, a pair of left and right shielding crimp pieces 37, and a pair of left and right sheath crimp pieces 38. The bottom wall portion 35 is continuous with the rear end of the rear reinforcement portion 33R (interference portion 34) at an obtuse angle, and extends rearward from the rear reinforcement portion 33R. The support wall portions 36 are continuous with the rear edges of the left and right side wall portions 26, at an obtuse angle, and extend rearward from the side wall portions 26, respectively. The lower edges of the support wall portions 36 are continuous with the front end portions of the left and right side edges of the bottom wall portion 35 at an angle close to 90 degrees, respectively. The rear end portions of the left and right side wall portions 26, the interference portion 34, the front end portion of the bottom wall portion 35, and the left and right support wall portions 36 form a box portion that is open upward, forward, and rearward.

The shielding crimp pieces 37 protrude from the central portion in the front-rear direction of the left and right side edges of the bottom wall portion 35, respectively. The bottom wall portion 35 and the shielding crimp pieces 37 constitute an open barrel-shaped shielding barrel portion 39. The sheath crimp pieces 38 protrude from the central portion in the front-rear direction of the left and right side edges of the bottom wall portion 35. The bottom wall portion 35 and the sheath crimp pieces 38 constitute an open barrel-shaped sheath barrel portion 40.

A cover member 50 is formed by attaching a shielding member 51 and an insulating member 63 to each other. The shielding member 51 is formed by bending a metal plate member. The shielding member 51 is a single component that includes a connection portion surrounding portion 52 whose lower, front, and rear surfaces are open, a shielding surrounding portion 58, and a connection piece 67.

The connection portion surrounding portion 52 includes a horizontal substrate portion 53, and a pair of side plate portions 54 that are symmetrical in the left-right direction and respectively extend downward from the left and right side edges of the substrate portion 53. Each side plate portion 54 is provided with a locking hole 56 that extends through the side plate portion 54 in the thickness direction thereof. The bottom edges of the left and right side plate portions 54 (protruding edges from the substrate portion 53) are each provided with a pair of front and rear protrusions 55 that protrude to the side opposite from the substrate portion 53. The front protrusion 55 is located at the front end portion of the side plate portion 54. The rear protrusion 55 is located at a position slightly forward of the rear end portion of the side plate portion 54. The rear end portion of the lower edge portion of each slide plate portion 54, that is, the portion rearward of the rear protrusion 55, functions as an abutment portion 57 configured to abut against the interference portion 34.

The front-rear length of the side plate portion 54 is smaller than the front-rear opening length of the first opening portion 31. The front-rear opening length of the first opening portion 31 is the distance between the rear end of the tubular shielding portion 21 and the front end of the shielding barrel portion 39 (shielding crimp pieces 37). The front-rear length of each side plate portion 54 is set to a length greater than the front-rear opening length of the second opening portion 32. The front-rear opening length of the second opening portion 32 is the distance between the rear end of the front reinforcement portion 33F and the front end of the rear reinforcement portion 33R.

The shielding surrounding portion 58 is continuous with the rear end portion of the substrate portion 53 and extends rearward from the connection portion surrounding portion 52. The shielding surrounding portion 58 forms an open barrel shape including a base portion 59 that is continuous with the substrate portion 53, and a pair of crimp portions 60 that respectively extend from the left and right side edges of the base portion 59. The connection piece 67 is continuous with the front edge of the base substrate portion 53, and protrudes bent to the front side of the substrate portion 53.

The insulating member 63 is made of a synthetic resin, and has the same shape as the connection portion surrounding portion 52. As shown in FIGS. 3 and 5, the insulating member 63 is a single component that includes an upper surface portion 64 that has a horizontal plate shape, and a pair of side surface portions 65 that extend downward from the left and right side edges of the upper surface portion 64, respectively. The upper surface portion 64 is overlaid onto the inner surface of the substrate portion 53, and the side surface portions 65 are respectively overlaid onto the inner surfaces of the side plate portions 54. As shown in FIG. 4, the insulating member 63 is held attached to the shielding member 51 as a result of locking protrusions 66 provided on the outer surfaces of the side surface portions 65 being locked to the locking holes 56.

The shielded electrical wire 70 is a known electrical wire that includes a core wire 71, a tubular insulating body 72 that surrounds the core wire 71, a tubular shielding layer 73 made of braided wires or the like arranged along the outer circumference of the tubular insulating body 72, and a sheath 74 that surrounds the shielding layer 73. The sheath 74 is removed from the front end portion of the shielded electrical wire portion 70 and thus the front end portion of the shielding layer 73 is exposed in a state of being overlaid on the outer circumference of the tubular insulating body 72, and the core wire 71 is exposed from and protrudes forward from the front end of the tubular insulating body 72.

Next, the procedure for assembling the shielded terminal will be described. The dielectric body 15 surrounding the inner conductor 11 and the outer conductor 20 are attached to each other. In this attached state, the inner conductor 11 is housed in the tubular shielding portion 21, and the core wire crimping portion 14 of the inner conductor 11 protrudes rearward from the dielectric body 15 while being housed in the connection space 28 of the outer conductor 20. The front end portion of the shielded electrical wire 70 and the crimping shielding portion 23 of the outer conductor 20 are connected to each other around the time that the inner conductor 11 and the outer conductor 20 are attached to other. At this time, the shielding barrel portion 39 is crimped to the outer circumference of the shielding layer 73 of the shielded electrical wire 70, and the sheath barrel portion 40 is crimped to the outer circumference of the sheath 74.

In a state where the shielded electrical wire 70 and the outer conductor 20 are connected to each other, the core wire 71 protruding forward from the tubular insulating body 72 is housed in the connection space 28. In the connection space 28, the core wire crimping portion 14 of the inner conductor 11 is electrically connected to the core wire 71 through crimping. Connection between the core wire 71 and the inner conductor 11 is performed by inserting an anvil and a crimper of an automatic machine (not shown) into the connection space 28 through the first opening portion 31 and the second opening portion 32.

Once the dielectric body 15, the inner conductor 11, and the shielded electrical wire 70 have been attached to the outer conductor 20, the cover member 50 is attached to the outer conductor 20. When attaching the cover member 50, the lower end portions of the left and right side plate portions 54 are oriented downward, and the shielding surrounding portion 58 is inserted into the first opening portion 31 from above the outer conductor 20. Once the cover member 50 has been attached to the outer conductor 20, the shielding surrounding portion 58 enters a state where it covers the outer circumference of the shielding barrel portion 39, and the shielding surrounding portion 58 is crimped to the outer circumference of the shielding barrel portion 39. The connection piece 67 elastically comes into contact with the outer circumference of the rear end portion of the tubular shielding portion 21.

In the connection space 28, the side plate portions 54 of the shielding member 51 and the side surface portions 65 of the insulating member 63 are pressed into a shape so as to surround the connection portion between the inner conductor 11 and the core wire 71. The pressing is performed by inserting a mold of a press machine (not shown) into the connection space 28 through the first opening portion 31 and the second opening portion 32. The protrusions 55 protrude from the lower edge of the side plate portions 54, and thus the side plate portions 54 and the side surface portions 65 are bent in response to the protrusions 55 being hooked to the mold.

When attaching the cover member 50 and the outer diameter 20 to each other, as shown in FIGS. 4 and 5, if the connection portion surrounding portion 52 is housed in the connection space 28 from the second opening portion 32, the shielding surrounding portion 58 cannot be properly crimped to the crimping shielding portion 23. Also, the connection piece 67 cannot be properly connected to the tubular shielding portion 21.

As a means for preventing the cover member 50 from being attached to the second opening portion 32, in Embodiment 1, the interference portion 34 is provided on the opening edge of the second opening portion 32. By providing the interference portion 34, the front-rear opening length of the second opening portion 32 can be made smaller than the front-rear length of the side plate portions 54 of the cover member 50. Accordingly, if an attempt is made to attach the cover member 50 to the second opening portion 32 from the outer surface side of the outer conductor 20, once the protrusions 55 have first moved into the second opening 32, the abutment portions 57 at the rear ends of the side plate portions 54 abut against the interference portion 34 from the outer side, as shown in FIG. 5. Accordingly, the side plate portions 54 are prevented from further entering the second opening 32 (connection space 28).

The shielded terminal of Embodiment 1 includes the outer conductor 20, the shielded electrical wire 70, the inner conductor 11, the cover member 50, and the interference portion 34. The outer conductor 20 has the connection space 28 sandwiched between the pair of side wall portions 26, and the connection space 28 is open to the outside via the first opening portion 31 and the second opening portion 32. The shielding layer 73 of the shielded electrical wire 70 is connected to the crimping shielding portion 23 of the outer conductor 20. The inner conductor 11 is housed in the tubular shielding portion 21 of the outer conductor 20 and is connected to the core wire 71 of the shielded electrical wire 70 in the connection space 28.

The cover member 50 is a member that is attached within the connection space 28 through the first opening portion 31, and surrounds the connection portion between the core wire 71 and the inner conductor 11. The opening edge portion of the second opening portion 32 is provided with the interference portion 34 that interferes with the cover member 50. When an attempt is made to attach the cover member 50 to the second opening portion 32, interference occurs between the cover member 50 and the interference portion 34, and thus the cover member 50 cannot be attached to the second opening portion 32. Accordingly, with the shielded terminal of Embodiment 1, incorrect attachment of the cover member 50 to the outer conductor 20 can be prevented.

The interference portion 34 bridges the pair of side wall portions 26. The interference portion 34 is more rigid than an interference portion that protrudes from the side wall portions 26 in the manner of a cantilever, and thus incorrect attachment of the cover member 50 can be reliably prevented.

The outer conductor 20 has the crimping shielding portion 23 that is crimped to the shielding layer 73 of the shielded electrical wire 70. The crimping shielding portion 23 has the pair of support wall portions 36 that are diagonally continuous with the rear edge portions of the pair of side wall portions 26, and the bottom wall portion 35 that links the pair of support wall portions 36 to each other on the rear side of the second opening portion 32. The interference portion 34 is formed so as to span the distance between the pair of side wall portions 26, and to be continuous with the bottom wall portion 35 over the entire length thereof.

The interference portion 34 is continuous with the crimping shielding portion 23, the pair of side wall portions 26, the pair of support wall portions 36, and the bottom wall portion 35. The interference portion 34 of Embodiment 1 is more rigid than an interference portion that protrudes from the side wall portions 26 or the crimping shielding portion 23 in the manner of a cantilever. Furthermore, the pair of side wall portions 26, the pair of support wall portions 36, and the bottom wall portion 35 are continuous with each other with their wall surfaces facing different directions to each other, and thus the rigidity is increased. Accordingly, the rigidity of the interference portion 34 that is continuous with the wall portions 26, 35, and 36 is also further increased. Thus, incorrect attachment of the cover member 50 can be reliably prevented.

The interference portion 34 is formed so as to extend along the rear edge portion of the second opening portion 32. The cover member 50 has the pair of side plate portions 54. The pair of side plate portions 54 are arranged so as to extend along the inner surfaces of the pair of side wall portions 26, and surround the connection portion between the core wire 71 and the inner conductor 11. The front-rear length of the pair of side plate portions 54 is set to be larger than the front-rear opening length of the second opening portion 32. With this configuration, the side plate portions 54 that surround the connection portion between the core wire 71 and the inner conductor 11 do not interfere with the interference portion 34, and thus there is no need to form a portion on the cover member 50 side that is dedicated to interference with the interference portion 34. Accordingly, the shape of the cover member 50 can be prevented from becoming complex.

The protrusions 55 are formed on the insertion edge portions on the leading end of the pair side plate portions 54 in a direction in which the side plate portion 54 are inserted into the first opening portion 31. The protrusions 55 are disposed in regions that do not correspond to the interference portion 34 in the front-rear direction. With this configuration, when the cover 50 is attached within the connection space 28 through the first opening portion 31, the protrusions 55 are disposed in the opening region of the second opening portion 32 without being hidden by the interference portion 34. Accordingly, the mold of the press machine can be abutted against the protrusions 55 in the second opening portion 32 and deform the side plate portions 54, and thus the connection portion between the core wire 71 and the inner conductor 11 can be surrounded by the cover member 50. By providing the protrusions 55, an operation for deforming the side plate portions 54 using a mold of a press machine can be reliably performed.

Other Embodiments

The present invention described herein is not limited to the embodiments thus described using the above description and drawings but is indicated by the claims. All changes that come within the meaning and range of equivalency of the claims as well as embodiments such as the following are intended to be embraced in the present invention.

In Embodiment 1, the interference portion is provided on the rear edge portion of the second opening portion, but the interference portion may be formed on the front edge portion or a side edge portion of the second opening portion.

In Embodiment 1, the interference portion bridges the pair of side wall portions, but the interference portion may protrude from a side wall portion in the manner of a cantilever.

In Embodiment 1, the interference portion is continuous with the pair of side wall portions and the crimping shielding portion, but the interference portion may be continuous with either the side wall portions or the crimping shielding portion.

In Embodiment 1, the side plate portions of the cover member interfere with the interference portion, but the interference portion may interfere with a different portion from the side plate portions.

In Embodiment 1, the protrusions are formed on the insertion edge portion of each side plate portion, but a configuration where the side wall portions do not include the protrusions is possible.

LIST OF REFERENCE NUMERALS

10 Terminal fitting
11 Inner conductor
12 Main body portion
13 Elastic contact portion
14 Core wire crimping portion
15 Dielectric body
20 Outer conductor
21 Tubular shielding portion
22 Connection shielding portion
23 Crimping shielding portion
25 Front wall portion
26 Side wall portion
27 Stabilizer
28 Connection space
31 First opening portion
32 Second opening portion
33F Front reinforcement portion
33R Rear reinforcement portion
34 Interference portion
35 Bottom wall portion
36 Support wall portion
37 Shielding crimp piece
38 Sheath crimp piece
39 Shielding barrel portion
40 Sheath barrel portion
50 Cover member
51 Shield member
52 Connection portion surrounding portion
53 Substrate portion
54 Side plate portion
55 Protrusion
56 Locking hole
57 Abutment portion
58 Shielding surrounding portion
59 Base portion
60 Crimp portion
63 Insulating member
64 Upper surface portion
65 Side surface portion

66 Locking protrusion
67 Connection piece
70 Shielded electrical wire
71 Core wire
72 Tubular insulating body
73 Shielding layer
74 Sheath

What is claimed is:

1. A shielded terminal comprising:

an outer conductor that includes a connection space sandwiched between a pair of side wall portions, and in which the connection space is open to the outside via a first opening portion and a second opening portion;

a shielded electrical wire connected to the outer conductor;

an inner conductor housed in the outer conductor and connected to a core wire of the shielded electrical wire in the connection space; and a cover member that is attached within the connection space through the first opening portion, and surrounds a connection portion between the core wire and the inner conductor, wherein an opening edge portion of the second opening portion is provided with an interference portion configured to interfere with the cover member, wherein the interference portion is formed so as to extend along at least one of a front edge portion and a rear edge portion of the second opening portion, the cover member includes a pair of side plate portions that are arranged so as to extend along inner surfaces of the pair of side wall portions, and surround the connection portion between the core wire and the inner conductor, and a front-rear length of the pair of side plate portions is set to a length greater than a front-rear opening length of the second opening portion, wherein a protrusion is formed on an insertion edge portion on a leading end of the pair of side plate portions in a direction in which the side plate portions are inserted into the first opening portion, and the protrusion is disposed in a region that does not correspond to the interference portion in a front-rear direction.

2. The shielded terminal according to claim 1, wherein the interference portion bridges the pair of side wall portions.

3. The shielded terminal according to claim 1, wherein the interference portion is formed so as to extend along at least one of a front edge portion and a rear edge portion of the second opening portion, the pair of side plate portions are arranged so as to extend along inner surfaces of the pair of side wall portions, and surround the connection portion between the core wire and the inner conductor, and a front-rear length of the pair of side plate portions is set to a length greater than a front-rear opening length of the second opening portion.

4. The shielded terminal according to claim 1, wherein the outer conductor has a crimping shielding portion that is crimped to a shielding layer of the shielded electrical wire, and the interference portion is continuous with the side wall portions and the crimping shielding portion.

5. The shielded terminal according to claim 4, wherein the crimping shielding portion includes:

a pair of support wall portions that are respectively diagonally continuous with rear edge portions of the pair of side wall portions; and a bottom wall portion that links the pair of support wall portions to each other on a rear side of the second opening portion, and the interference portion is formed so as to bridge the pair of side wall portions and to be continuous with the bottom wall portion over the entire length thereof.

6. A shielded terminal comprising:

an outer conductor that includes a connection space sandwiched between a pair of side wall portions, and in which the connection space is open to the outside via a first opening portion and a second opening portion;

a shielded electrical wire connected to the outer conductor;

an inner conductor housed in the outer conductor and connected to a core wire of the shielded electrical wire in the connection space; and a cover member that is attached within the connection space through the first opening portion, and surrounds a connection portion between the core wire and the inner conductor, wherein an opening edge portion of the second opening portion is provided with an interference portion configured to interfere with the cover member, wherein the cover member includes a pair of side plate portions, and wherein a protrusion is formed on an insertion edge portion on a leading end of the pair of side plate portions in a direction in which the side plate portions are inserted into the first opening portion.

7. The shielded terminal according to claim 6, wherein the interference portion bridges the pair of side wall portions.

8. The shielded terminal according to claim 6, wherein the outer conductor has a crimping shielding portion that is crimped to a shielding layer of the shielded electrical wire, and the interference portion is continuous with the side wall portions and the crimping shielding portion.

9. The shielded terminal according to claim 8, wherein the crimping shielding portion includes:

a pair of support wall portions that are respectively diagonally continuous with rear edge portions of the pair of side wall portions; and a bottom wall portion that links the pair of support wall portions to each other on a rear side of the second opening portion, and the interference portion is formed so as to bridge the pair of side wall portions and to be continuous with the bottom wall portion over the entire length thereof.

* * * * *